(No Model.)

J. H. PRIESTLEY.
AUTOMATIC BRAKE.

No. 481,190.   Patented Aug. 23, 1892.

Witnesses

Inventor
John H. Priestley.
By his Attorneys,

THE NORRIS PETERS CO., PHOTO-LITHO., WASHINGTON, D. C.

UNITED STATES PATENT OFFICE.

JOHN H. PRIESTLEY, OF MERIDEN, IOWA.

AUTOMATIC BRAKE.

SPECIFICATION forming part of Letters Patent No. 481,190, dated August 23, 1892.

Application filed March 31, 1892. Serial No. 427,280. (No model.)

*To all whom it may concern:*

Be it known that I, JOHN H. PRIESTLEY, a citizen of the United States, residing at Meriden, in the county of Cherokee and State of Iowa, have invented a new and useful Automatic Brake, of which the following is a specification.

The invention relates to improvements in automatic brakes.

The object of the present invention is to simplify and improve the construction of automatic brakes and to enable the brake-shoes to be readily held off the wheels while backing.

The invention consists in the construction and novel combination and arrangement of parts hereinafter fully described, illustrated in the accompanying drawings, and pointed out in the claims hereto appended.

Figure 1:
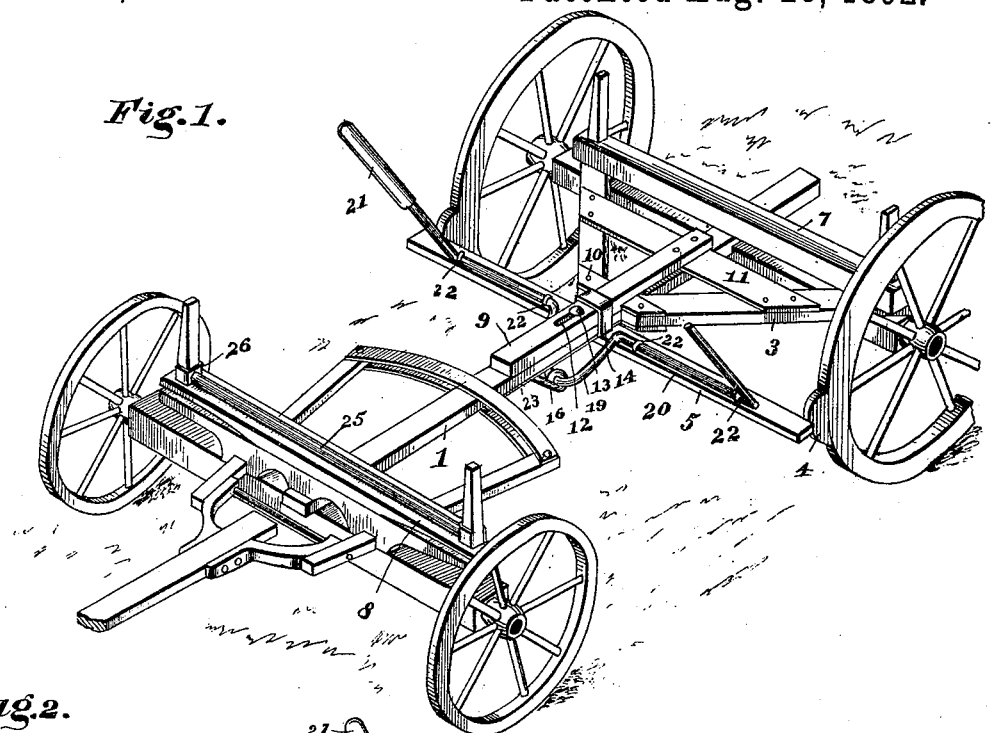
Figure 2:
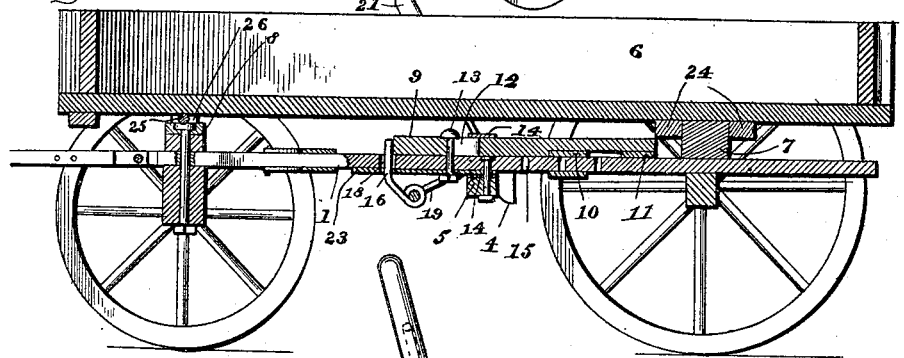
Figure 3:
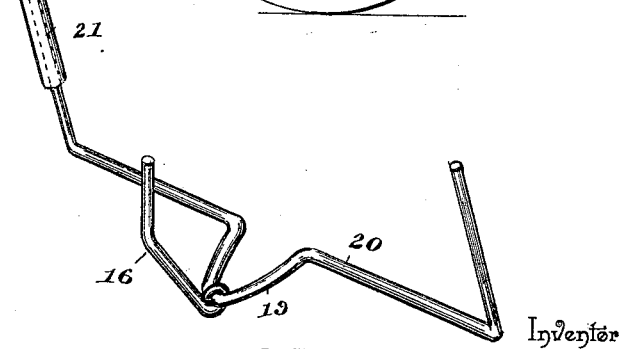

In the drawings, Figure 1 is a perspective view of the running-gear of a vehicle provided with an automatic brake constructed in accordance with this invention, the wagon body or box being removed. Fig. 2 is a longitudinal sectional view, the wagon body or box being in position. Fig. 3 is a detail perspective view of the rock-shaft and pin.

Like numerals of reference indicate corresponding parts in all the figures of the drawings.

1 designates a reach of a running-gear pivoted at its front end at the front axle and having its rear portion loosely arranged between the rear hounds 3, which have a limited movement on the reach 1 to carry the hind wheels to and from brake-shoes 4. The brake-shoes 4 are arranged at the ends of a transverse brake-bar 5, which is secured to the reach 1, and the body or box 6 is rigidly connected with the rear bolster 7 and rests loosely on the front bolster 8, whereby when the body or box 6 is thrown forward, as in descending a hill, the hind wheels will be carried into engagement with the brake-shoes, thereby applying the brake and arresting the motion of the vehicle. A supplemental reach 9 is mounted on the upper face of the main reach 1. Its rear portion is secured to cross-bars 10 and 11, which connect the rear hounds, and its front portion is provided with a longitudinal slot 12, in which is arranged a pin 13, which is secured to the main reach 1. The length of the slot determines the longitudinal movement of the body or box and should be sufficient to allow the brake to be fully applied or to allow the hind wheels to come in complete engagement with the brake-shoes. The supplemental reach 9 is secured by a band 14 with the main reach 1, and the latter is provided with a series of perforations 15, adapted for the reception of the pin 13 to permit the running-gear to be adjusted to the body or box or to be lengthened for hauling a load of hay or the like. The supplemental reach is held against longitudinal movement when the vehicle is backing, to prevent the brake being applied, by a pin 16, having its upper end arranged in a perforation 18 of the main reach 1 and having its lower end connected to a crank-loop 19 of a rock-shaft 20, which is journaled in suitable bearings on the upper face of the brake-bar and which is provided at its ends with arms adapted for the reception of a handle 21, whereby the rock-shaft is turned to raise the pin 16 to bring its upper end above the main reach 1 to form a stop to be engaged by the front end of the supplemental reach 9 to hold the latter stationary. The rock-shaft is journaled in clips 22, having their ends pass through the brake-bar 5, provided with burrs, so that the rock-shaft can be drawn down sufficiently tight on brake-bar 5. The reach is strengthened at its middle adjacent to the pin 16 and the pin 13 by a metal plate 23, secured to its lower face. The body 6 is provided near its rear end and on the lower face of its bottom with parallel transverse cleats 24, arranged on opposite sides of the rear bolster and receiving the latter and connecting the body rigidly with the rear bolster.

It will be seen that the brake is simple and inexpensive in construction, that it is automatic in operation, and that in backing the brake-shoes may be readily held off the wheels. The handle 21 has a socket to receive the arm of the rock-shaft and is detachable, so that when the body of the vehicle is removed to adapt the vehicle for other purposes the handle may also be detached. The front of the body is supported directly upon a transverse roller 25, which has its ends journaled in suitable bearings of clips 26, which are fastened to the front standards. By this construction the body is enabled to move freely and no friction caused by the weight of a load can interfere with the operation of a brake.

What I claim is—

1. The combination, with a running-gear having the rear hounds loosely connected with the reach and capable of a limited movement thereon, of a stationary brake-bar secured to the reach and provided at its ends with brake-shoes arranged to be engaged by the hind wheels, and a rock-shaft mounted on the brake-bar and carrying a stop-pin adapted to hold the rear hound against movement on the reach to prevent the brake being applied, substantially as described.

2. The combination of a running-gear having the rear hounds loosely connected with the main reach, a supplemental reach mounted on the main reach and connected with the rear hounds, a stationary brake-bar secured to the main reach and carrying brake-shoes arranged to be engaged by the hind wheels, a rock-shaft mounted on the brake-bar and provided intermediate its ends with a crank-loop and having an arm, and a pin connected with and carried by the crank-loop and arranged in an opening of the main reach and adapted to be projected above the latter to form a stop to be engaged by the supplemental reach, substantially as described.

In testimony that I claim the foregoing as my own I have hereto affixed my signature in the presence of two witnesses.

JOHN H. PRIESTLEY.

Witnesses:
W. N. RANKINS,
D. E. WARE.